Feb. 27, 1940. C. G. SEYFERTH 2,191,866
LANDING GEAR
Filed July 22, 1939   3 Sheets-Sheet 1

Witness:
John S. Braddock

Inventor
Carl G. Seyferth
By Rice and Rice
Attorneys

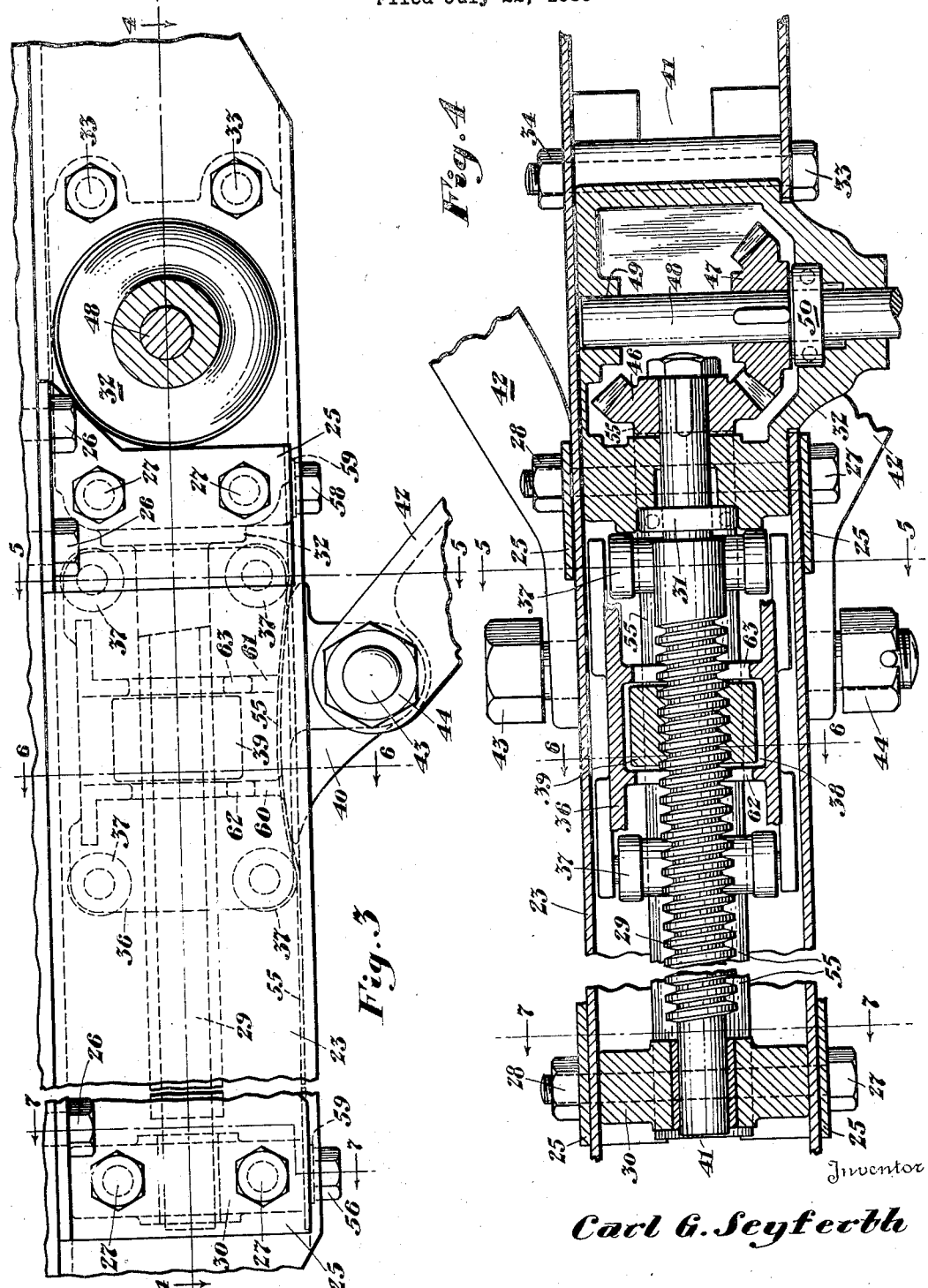

Feb. 27, 1940.  C. G. SEYFERTH  2,191,866
LANDING GEAR
Filed July 22, 1939  3 Sheets-Sheet 3
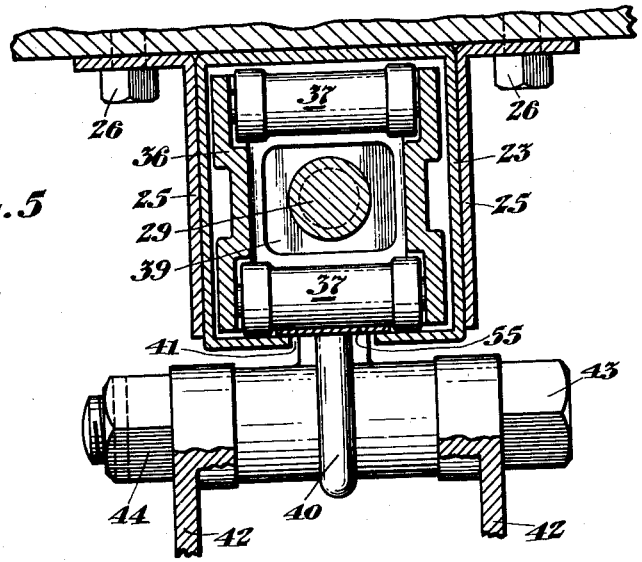
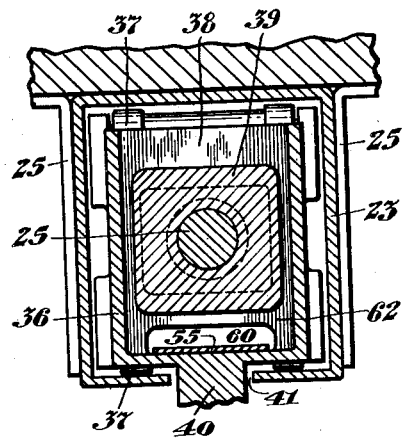 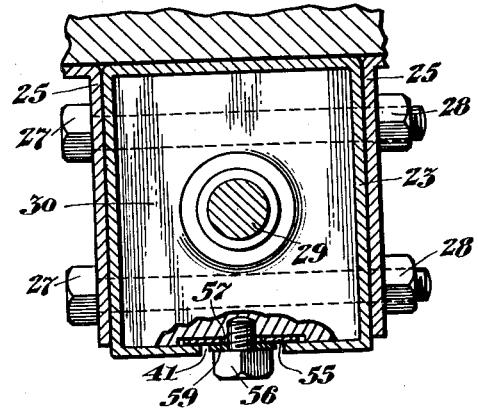
Inventor
Carl G. Seyferth
Witness:—
John S. Braddock
By Rice and Rice
Attorneys Patented Feb. 27, 1940

2,191,866

UNITED STATES PATENT OFFICE 2,191,866

LANDING GEAR

Carl G. Seyferth, Muskegon, Mich., assignor to West Michigan Steel Foundry Co., Muskegon, Mich., a corporation of Michigan Application July 22, 1939, Serial No. 285,873

2 Claims. (Cl. 254—86)

The present invention relates to landing gears for trailers or the like, and more particularly to landing gears of the retractable type wherein auxiliary wheels are dependingly pivotally connected adjacent the forward end of the trailer and which auxiliary wheels may be retracted or swung upwardly to a position of non-use when the trailer is coupled to a truck or to a tractor.

The primary objects of the instant invention are to provide means whereby the mechanism for retracting or lowering the auxiliary wheels of the landing gear is protected from dirt, dust or mud that otherwise would enter the housing for the mechanism and thereby interfere with its efficient performance; to provide such protective means which is simple in construction; to provide such means which is effective in use; and, to provide such means which is economical in manufacture.

An illustrative embodiment of the invention is shown in the accompanying drawings, wherein:

Figure 3 is an enlarged fragmentary side elevational view of the retracting mechanism, certain parts thereof being shown in section on line 3—3 of Figure 2;

Figure 4 is a sectional view thereof on line 4—4 of Figure 3;

Figure 5 is a sectional view thereof on lines 5—5 of Figures 3 and 4;

Figure 6 is a sectional view thereof on lines 6—6 of Figures 3 and 4; and

Figure 7 is a sectional view thereof on lines 7—7 of Figures 3 and 4.

Figure 1:
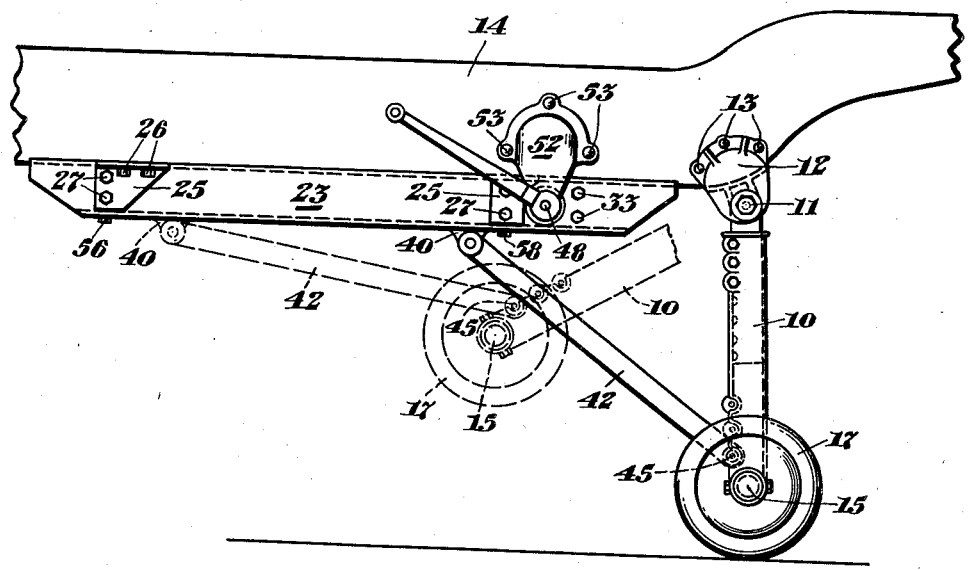
Figure 1 is a fragmentary side elevational view of the forward part of a trailer frame with a landing gear of the retractable type mounted thereon, the landing gear being shown in dotted lines in its retracted position.
Figure 2:
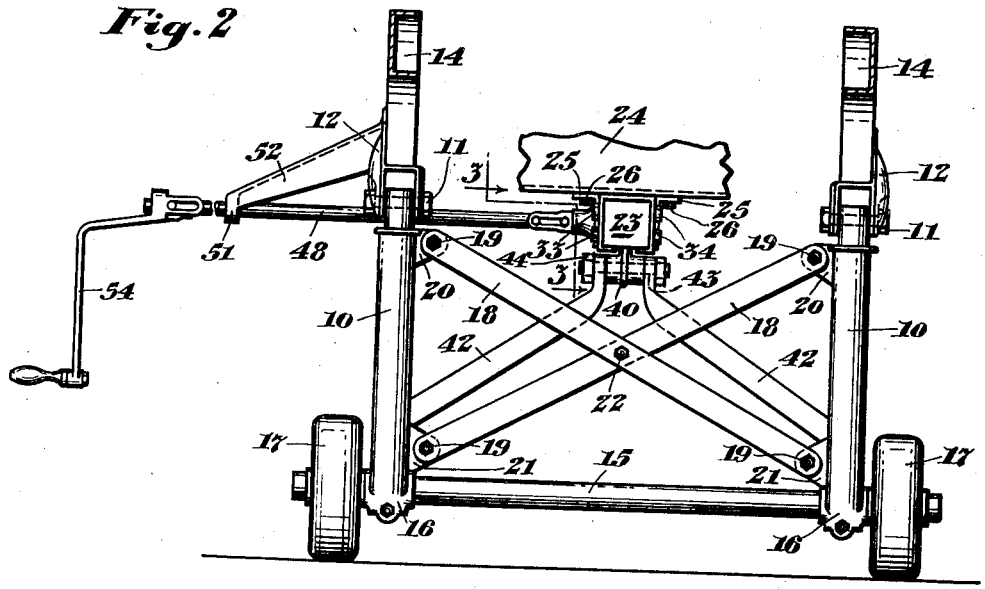
Figure 2 is a fragmentary front elevational view thereof.

Referring then to these drawings wherein like parts of the structure shown are designated by the same numerals in the several views, the retractable landing gear thus shown comprises vertically spaced depending posts 10 pivotally secured as by bolts 11 to mounting elements 12 which are secured as by rivets 13 to the opposite sides respectively of the trailer frame 14.

An axle 15 is journalled in bearings 16 adjacent the free ends of the posts 10 and a pair of wheels 17 are rotatably mounted on the respective opposite ends of the axle 15. Diagonal struts 18 lend rigidity to the structure, each strut being secured as by bolts 19 to a lug 20 at the top of one post 10 and to a lug 21 at the bottom of the other post 10. The struts 18 are rigidly secured together at their point of crossing as by a bolt 22.

Means for retracting the wheels to their position of non-use as shown in dotted lines in Figure 1 and for lowering the wheels to their position of use as shown in full lines in the same view, includes a horizontally disposed elongated gear box 23 secured to the under side of the medial portion 24 of the trailer frame 14 as by brackets 25, said brackets being secured to the trailer frame as by bolts 26 and to the gear box as by bolts 27 having nuts 28 screw threadedly secured thereto.

A horizontally disposed screw threaded central shaft 29 within the gear box 23 is journalled at one end thereof within a bearing block 30 and near the other end thereof within a ball race 31 in a casting 32, said block 30 and casting 32 being secured in their respective positions within the gear box by the bolts 27 which pass therethrough and their nuts 28, all as best shown in Figures 3 and 4. Bolts 33 and their nuts 34 additionally secure the casting 32 within the gear box 23.

A carriage 36 within the gear box 23 and having upper and lower spaced pairs of antifriction rollers 37 is provided with a cavity 38 therein in which is disposed a nut 39 threaded on the worm portion of shaft 29 to effect forward-rearward travel of the carriage 36 within the gear box 23. The carriage 36 is further provided with an integrally formed central web portion 40 depending through a slot 41 in the floor of the gear box 23, said slot 41 extending the length of the floor of the gear box and centrally thereof. A pair of downwardly flared links 42 are pivotally connected at their upper ends to the depending web 40 of the carriage 36 as by means of a bolt 43 passing through aligned apertures in the links 42 and through the web 40 secured by the bolt 44. The lower or downwardly flared ends of the links 42 are each pivotally connected at 45 to a post 10 near the lower end of each post.

A bevel gear 46 secured to the forward end of the central shaft 29 as seen in Figure 4 meshes with a bevel gear 47 on the inner end of a shaft 48 journalled in bearings 49, 50 in the casting 32 and the outer end of the shaft 48 projects laterally of the trailer frame 14 and is supported in a bearing 51 in a bracket 52 secured to the trailer frame as by rivets 53.

A manually rotatable crank 54 secured in any suitable manner to the outer end of the shaft 48 effects rotation of the central shaft 29 through the bevel gears 47, 46 which rotation of the central shaft advances or retracts the nut 39 and the carriage 36 to raise or lower the landing gear as desired.

All of the structure heretofore described is old in the art and, in the use of such structures, difficulties because of the entrance of mud and dirt into the gear box 23 through the slot 41 in the bottom thereof have been encountered. The present invention obviates these difficulties and effectively prevents such entrance of mud and dirt.

The invention resides in the provision of a thin, flexible sealing strip 55 of stainless steel or other non-corrosive metal within the gear box adjacent the slot 41. As seen in Figures 3 and 7, one end of said strip 55 is secured to the block 30 by means of a machine screw 56 passing through an aperture 57 in the strip 55 and threaded in the block 30. The other end of the strip 55 is similarly secured to the casting 32 by means of a machine screw 58 passing through an aperture in the strip 55 and threaded in the casting 32. Rubber washers 59 may be interposed between the heads of screws 56, 58 and the metal strip 55 to seal the apertures in the strip.

As best seen in Figures 3, 5, 6 and 7, the sealing strip 55 is sufficiently thin and therefore of sufficient flexibility to flex upwardly between the lower rollers 37 of the carriage 36 through openings 60, 61 in the walls 62, 63 of the carriage respectively and over the web portion 40 of the carriage 36. The sealing strip 55 maintains this relation in any moved position of the carriage 36 since it is of sufficient flexibility to permit unimpeded movement of the carriage.

It will thus be seen that the invention herein shown and described provides effective means for sealing the gear box 23 against the entrance of mud and dirt or other extraneous matter at all times and in any moved position of the carriage, and while but one specific embodiment thereof has been herein shown and described, it will be understood that certain details of the construction shown may be altered or omitted without departing from the spirit of this invention as the same is defined by the following claims.

I claim:

1. The combination with a gear box having a slot in the floor thereof and a carriage movable within the gear box and having a depending portion projecting through and movable in said slot, said carriage having an opening above its depending portion and having rollers disposed transversely of the slot at opposite ends of the carriage, of a flexible sealing strip secured within the gear box adjacent the slot and beyond the opposite ends of the carriage, said strip extending beneath the rollers and through the opening in the carriage above said depending portion thereof.

2. The combination with a gear box having a slot in the floor thereof and a carriage movable within the gear box and having a depending portion projecting through and movable in said slot, said carriage having an opening above its depending portion, of a flexible sealing strip secured within the gear box adjacent the slot and beyond the opposite ends of the carriage, said strip extending beneath the ends of the carriage and through the opening in the carriage above said depending portion thereof.

CARL G. SEYFERTH.